Nov. 11, 1958

W. Z. BARKLEY 2,859,718

TRANSPLANTING MACHINE

Filed Sept. 28, 1953

Wiley Z. Barkley INVENTOR.

BY Ogle R. Singleton

ATTORNEY

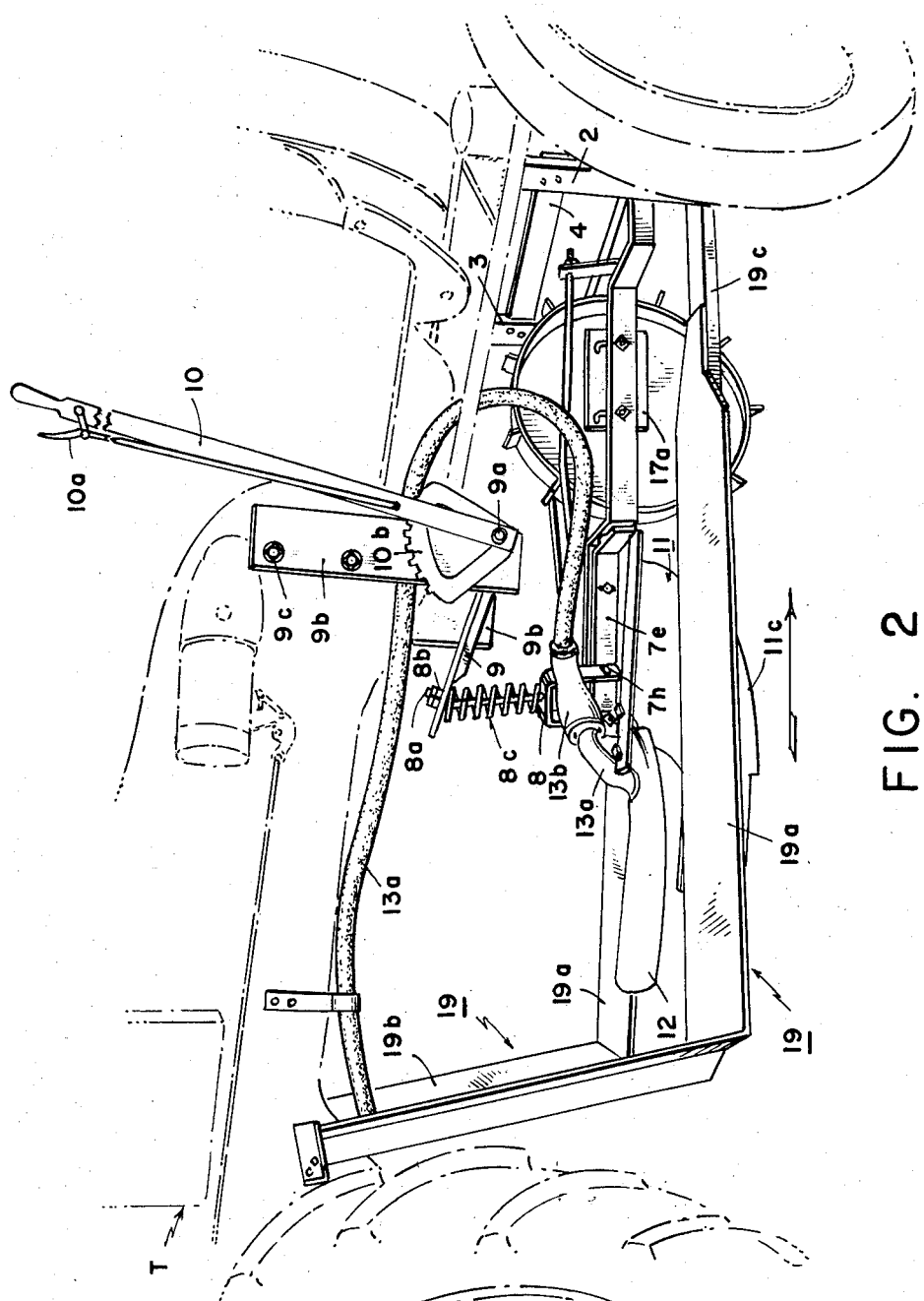

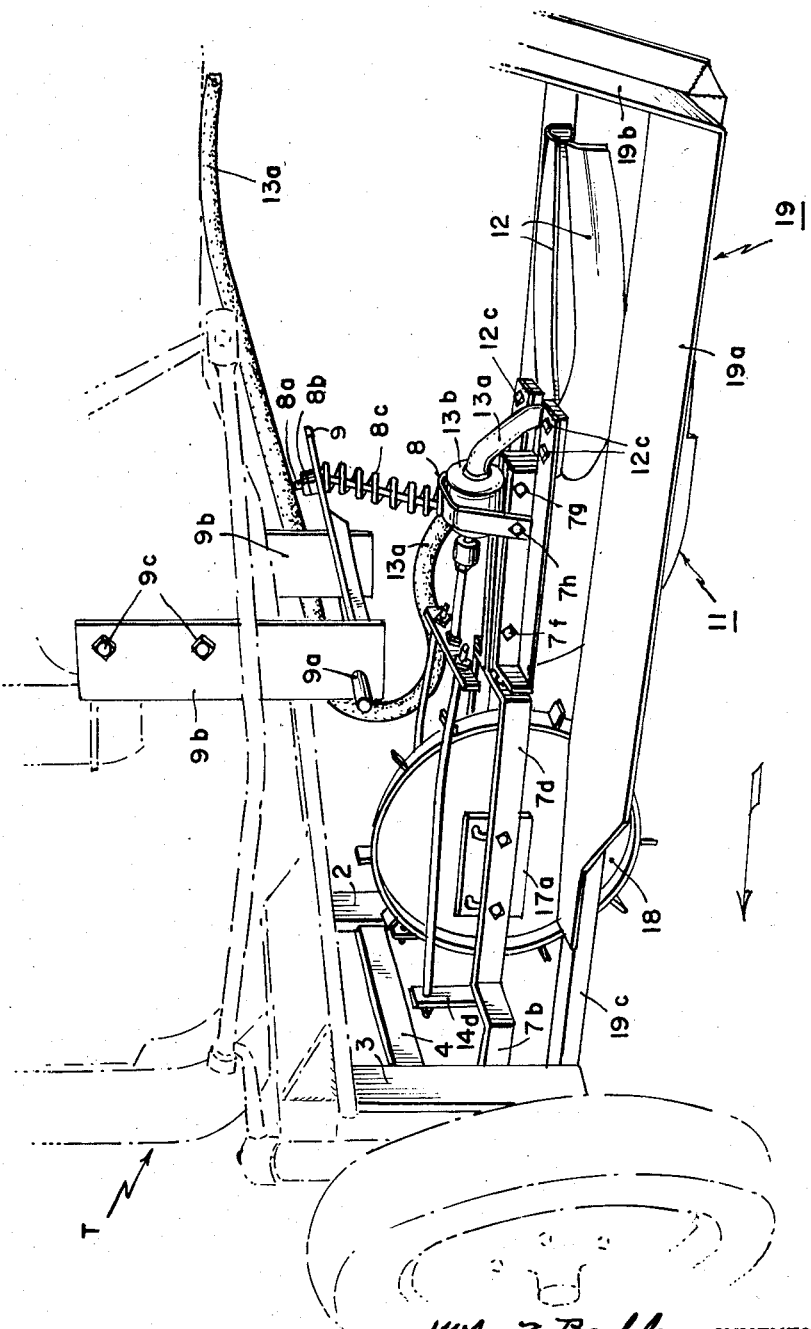

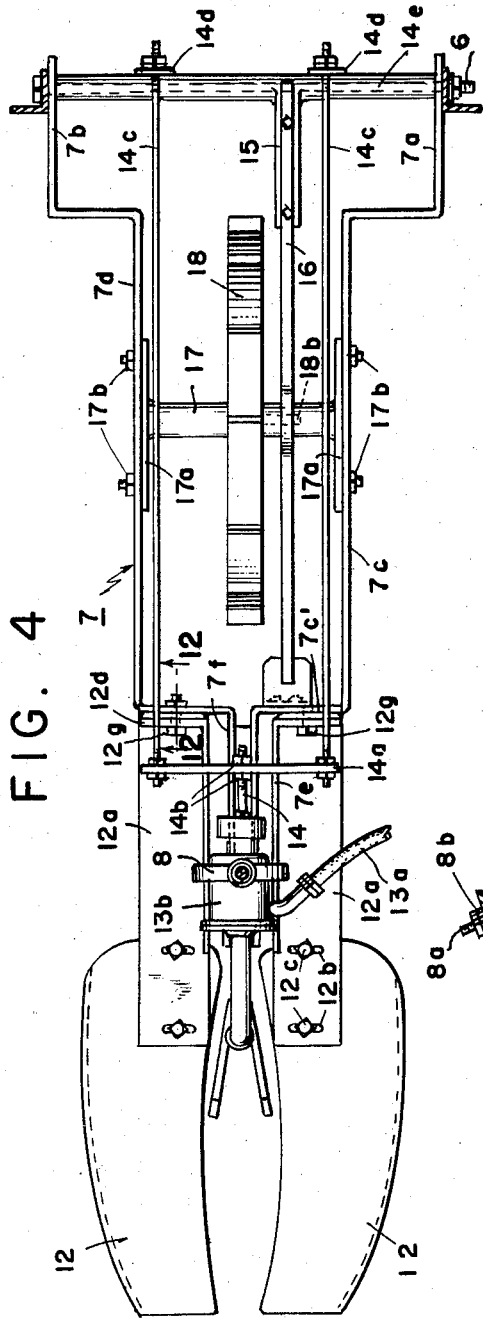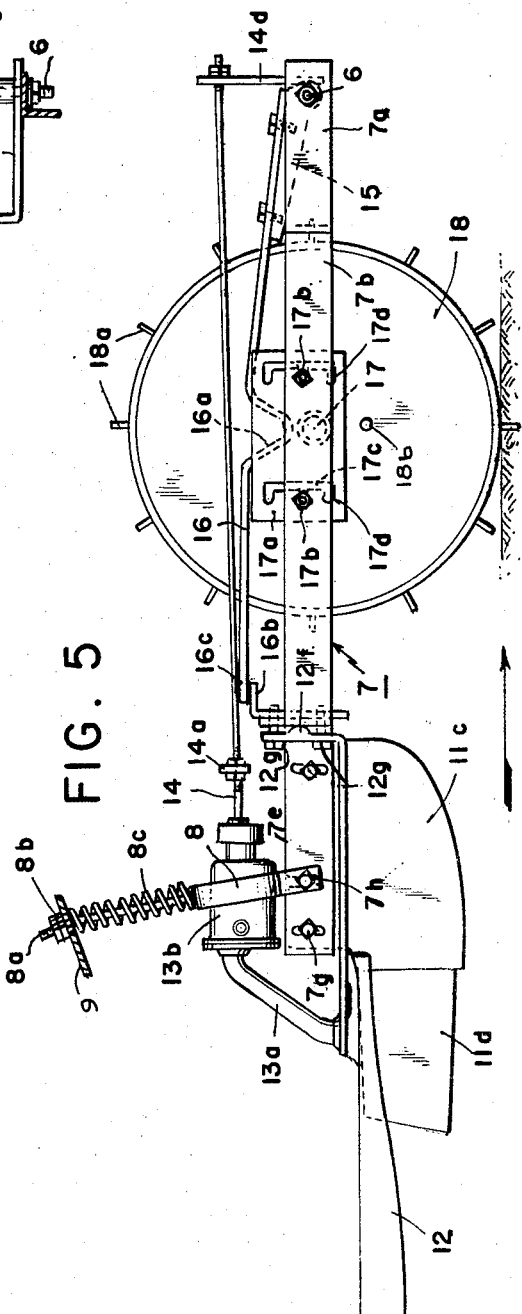

Nov. 11, 1958 — W. Z. BARKLEY — 2,859,718
TRANSPLANTING MACHINE
Filed Sept. 28, 1953 — 6 Sheets—Sheet 5

Wiley Z. Barkley INVENTOR.
BY Ogle R. Singleton
ATTORNEY

Nov. 11, 1958 W. Z. BARKLEY 2,859,718
TRANSPLANTING MACHINE
Filed Sept. 28, 1953 6 Sheets-Sheet 6
FIG. 10
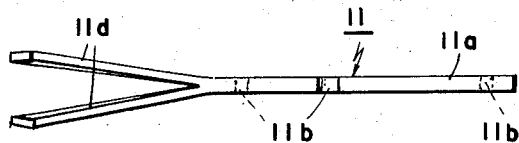
FIG. 11
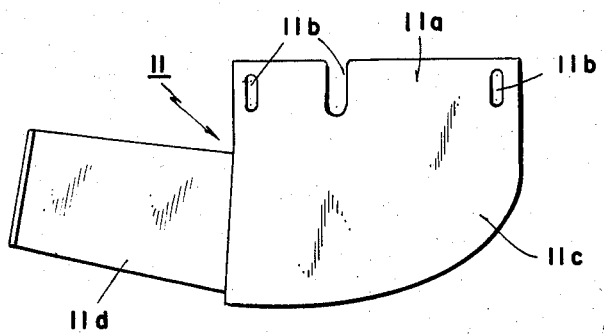
FIG. 12
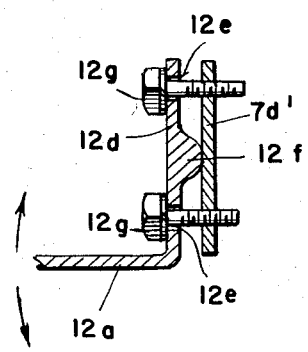
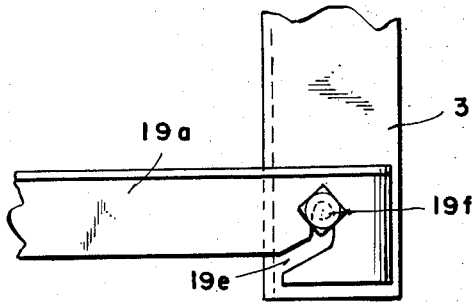
FIG. 13
Wiley Z. Barkley INVENTOR.
BY Ogle R. Singleton
ATTORNEY

United States Patent Office 2,859,718
Patented Nov. 11, 1958

2,859,718

TRANSPLANTING MACHINE

Wiley Z. Barkley, Wilson County, N. C.

Application September 28, 1953, Serial No. 382,557

2 Claims. (Cl. 111—7)

My invention consists in a new and useful improvement in transplanting machines and is designed to provide a machine which can be readily mounted on a suitable vehicle, such as an ordinary farm tractor, and used in the operation of transplanting any type of small plants, more particularly tobacco plants, from cultivation beds to the fields. The particularly novel and useful feature of my machine is the combination of a suitable, light and easily handled frame which can be readily mounted on and demounted from a tractor, means for levelling the row in which the plants are to be placed, means for opening a furrow, means for supplying measured amounts of water in the furrow at the precise intervals at which the plants are to be placed in the furrow, and means for shouldering earth about the placed plants, all of which means are carried by the frame and caused to function by the travel of the tractor over the row.

While I have illustrated in the drawings and hereinafter fully describe one specific embodiment of my invention, it is to be distinctly understood that I do not consider my invention to be limited to said specific embodiment but refer for its scope to the claims appended hereto.

In the drawings:

Fig. 2 is an enlarged perspective of the right hand side of the machine.

Fig. 3 is a view similar to Fig. 2 showing the left hand side of the machine.

Fig. 4 is a greatly enlarged top plan of the machine.

Fig. 5 is a side elevation of the machine.

Fig. 10 is a top plan of the trenching and spreading blade.

Fig. 11 is a side elevation of the blade of Fig. 10.

Fig. 12 is an enlarged vertical section on the line 12—12 of Fig. 4 in the direction of the arrows.

Fig. 13 is a greatly enlarged detail of the forward mounting of one of the seats.

Figure 1:
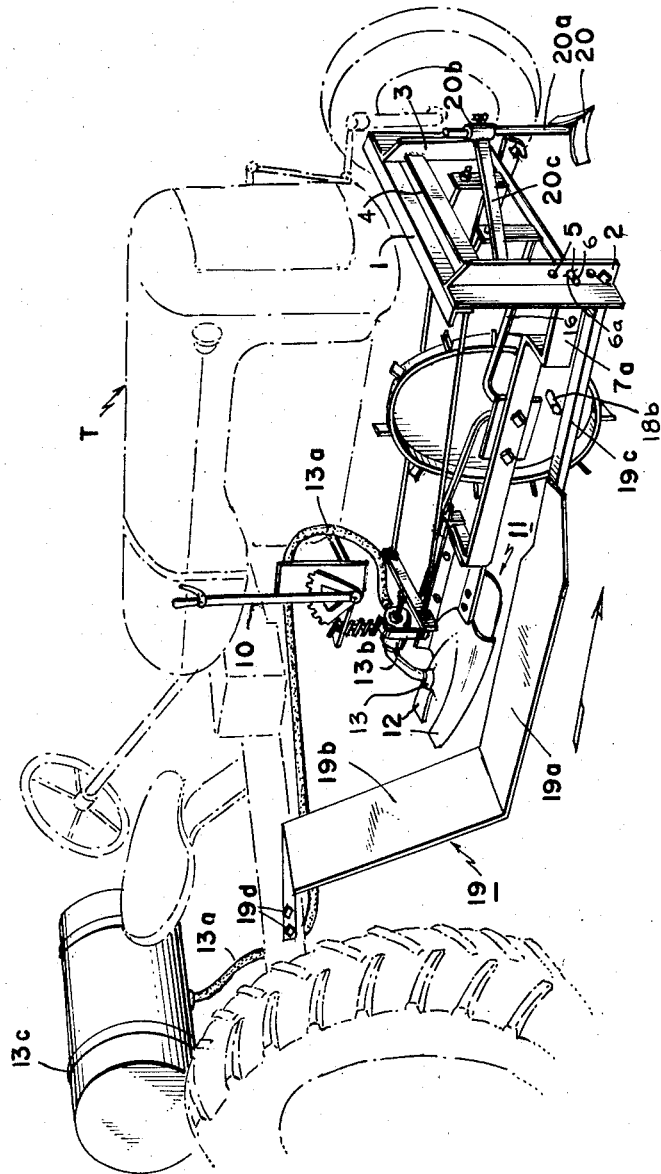
Fig. 1 is a perspective of the machine mounted on a tractor, the front right wheel thereof being broken away.
Figure 6:
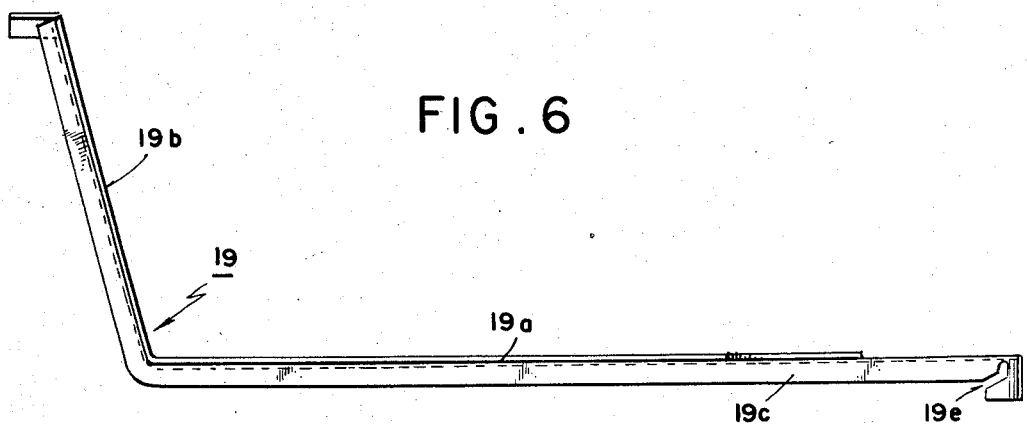
Fig. 6 is a greatly enlarged detail showing one of the seats for the machine, in side elevation.
Figure 7:
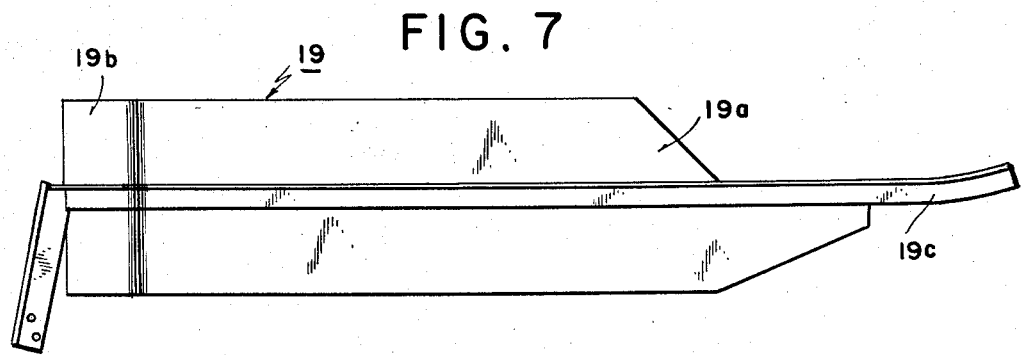
Fig. 7 is a bottom plan of the seat of Fig. 6.
Figure 8:
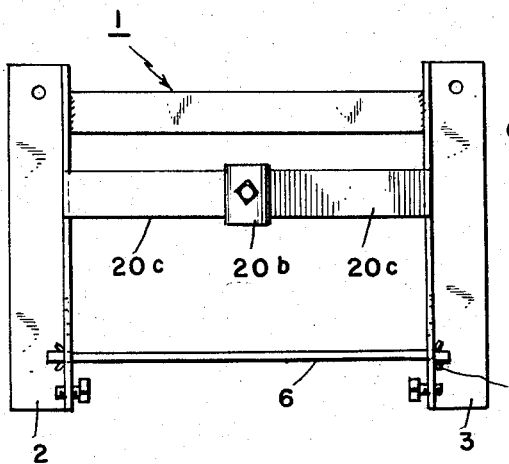
Fig. 8 is a front elevation of the forward bracket.
Figure 9:
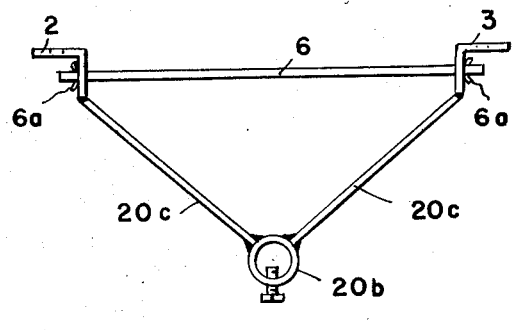
Fig. 9 is a top plan of the bracket of Fig. 8.

As illustrated in the drawings, my improved machine is removably mounted on an ordinary tractor T, parts of which are shown in broken lines in Figs. 1, 2 and 3. I provide a bracket 1 which is removably mounted in any suitable manner to the front end of the chassis of the tractor T and comprises two vertical L-beams 2 and 3 and a horizontal brace beam 4 connecting the beams 2 and 3. Series of registering holes 5 are provided in the beams 2 and 3 in which is mounted a rod 6 with cotter-pins 6–a (Figs. 1, 8 and 9). My machine is carried in a frame 7 (Figs. 4 and 5) comprising two side bars 7–a and 7–b. The forward end portions of these bars have suitable holes through which passes the rod 6 so that the frame 7 is pivotally mounted on the bracket 1. The bars 7–a and 7–b are turned toward one another a short distance behind the rod 6, and then turned rearwardly to provide parallel, relatively spaced, portions 7–c and 7–d. They are then again turned toward one another to form portions 7–c' and 7–d', and then turned rearwardly to provide parallel, relatively slightly spaced, rear end portions 7–e and 7–f which are connected at their rear ends by a bolt 7–g. A yoke 8 has its ends pivotally connected to portions 7–e and 7–f, respectively, by a bolt 7–h. A rod 8–a extends upwardly from the yoke 8, passes loosely through the end of a lever 9, and has on its end above the lever a lock nut 8–b. An expansion coil spring 8–c surrounds rod 8–a and bears on yoke 8 and lever 9. The lever 9 is fixed on a rock shaft 9–a journaled in brackets 9–b removably mounted on the chassis of the tractor T by bolts 9–c (Fig. 3). The shaft 9–a is provided with a hand lever 10 which has a latch 10–a and latch quadrant 10–b on one of the brackets 9–b (Fig. 2).

It is obvious from the foregoing description of the parts that the frame 7 has its rear end adjustably supported by the lever 9.

I provide a suitable trenching and spreading blade 11 (Figs. 10 and 11) which has a tongue 11–a received between the rear end portions 7–e and 7–f of the frame 7 (Fig. 4) being clamped therein by the bolt 7–g (Fig. 5) and a bolt 7–i. Slots 11–b are provided in the tongue 11–a, through which bolts 7–g, 7–h and 7–i pass to allow vertical adjustment of the blade 11 relative to the frame 7. The blade 11 has a forward trenching portion 11–c (Fig. 11) and rearwardly divergent spreading portions 11–d (Fig. 10).

I provide a pair of shouldering shoes 12 (Fig. 4) which are mounted on a pair of horizontal supporting plates 12–a having slots 12–b through which pass headed bolts 12–c for mounting the shoes 12 for relative horizontal adjustment. Each plate 12–a has at its forward end an upstanding flange 12–d (Fig. 12) having a pair of holes 12–e and an abutment 12–f extending horizontally across the flange 12–d intermediate the holes 12–e. The supporting plates 12–a are mounted on the portions 7–c' and 7–d', respectively, by bolts 12–g passed through holes 12–e of flanges 12–d and tapped into portions 7–c' and 7–d', the abutments 12–f bearing against the portions 7–c' and 7–d'. It is obvious from Fig. 12 that manipulation of bolts 12–g effects vertical adjustment of the shoes 12, the abutments 12–f allowing the supporting plates 12–a to rock relative the frame 7.

I provide a nozzle 13 (Fig. 1) downwardly disposed between the spreading portions 11–d (Fig. 4) of the blade 11, and having a pipe 13–a on which the nozzle 13 is mounted. This pipe 13–a is provided with a suitable valve (not shown) in a valve casing 13–b mounted in the yoke 8 (Fig. 5). The pipe 13–a leaving the casing 13–b is connected to a suitable water tank 13–c mounted on the tractor T (Fig. 1).

The valve is biased to closed position by a suitable spring (not shown) and is moved to open position by a valve rod 14 (Figs. 4 and 5) adjustably mounted on a cross-head 14–a by nuts 14–b. The cross-head 14–a is carried by pitmans 14–c adjustably attached to levers 14–d mounted on a rock sleeve 14–e loosely carried by the rod 6 (Figs. 1 and 4). A rearwardly extending crank arm 15 is fixed on the sleeve 14–e. The levers 14–d, rock sleeve 14–e and crank arm 15 constitute a bell-crank. The crank arm 15 has bolted thereon an operating resilient lever 16 (Figs. 4 and 5). This lever 16 has a suitably disposed bend 16–a substantially midway of its ends.

I will now describe the mechanism for rocking the lever 16. A shaft 17 (Fig. 4) is mounted on a pair of plates 17–a which are adjustably mounted on the portions 7–c and 7–d of the frame 7 by bolts 17–b passed through vertical slots 17–c in the plates 17–a, which have horizontal connected slots 17–d in which the bolts 17–b can be positioned to adjust the shaft 17 vertically relative to the frame 7. A wheel 18 is carried by the shaft 17 and has ground-engaging lugs 18–a. A pin 18–b is suitably disposed on the face of the wheel 18 and adapted to engage the bend 16–a of the lever 16 to lift the lever 16 on rotation of the wheel 18. I provide a plate 16–b so disposed on the portion 7–c' of the frame 7 as to engage the end 17–c of the lever 16, to act as a stop to limit the downward movement of the lever 16.

I provide a pair of platforms 19, each having a middle horizontal portion 19–a, a rearward upwardly extending portion 19–b and a forwardly extending tongue 19–c. Each portion 19–b is attached by bolts 19–d to the rear portion of the tractor T, and the tongues 19–c have curved slots 19–e (Fig. 13) in their ends in which are received bolts 19–f mounted in the beams 2 and 3 of the bracket 1 on the front of the tractor T.

A levelling plow 20 is mounted on the bracket 1 (Fig. 1) by a shaft 20–a adjustable in collar 20–b (Fig. 9) on arms 20–c of the bracket 1.

Having described the elements of construction of my improved machine, I will now describe the way in which the machine is mounted on the tractor T. The bracket 1 is mounted on the front end of the tractor T and brackets 9–b are bolted to the tractor T. The frame 7 is then mounted by passing the rod 6 through the forward ends of the side bars 7–a and 7–b of the frame 7 and the holes 5 in the beams 2 and 3, and secured in place by cotter-pins 6–a. The rear end of the frame 7 is then supported by attaching the rod 8–a to the lever 9 by lock nuts 8–b, the lever 9 having been mounted in the brackets 9–b. The platforms 19 are mounted on the tractor T by bolts 19–d and tongues 19–c hooked to the beams 2 and 3 of bracket 1. The plow 20 is mounted on the bracket 1. The tank 13–c is mounted on the tractor T and the pipe 13–a is connected with the tank 13–c.

I will now describe the use and operation of my machine. It will be noted (Fig. 2) that when the hand lever 10 is in its extreme forward position, the frame 7 is swung upwardly sufficiently to raise the lugs 18–a of the wheel 18 and blade 11 so that they will not contact the ground over which the tractor T can be driven to bring the machine to the position in the field where the planting is to be done. The tractor being positioned on one of the rows to begin planting, the lever 10 is retracted sufficiently to lower the frame 7 so that the blade 11 is forced into the ground and the lugs 18–a engage the ground.

Two workmen, carrying the plants, recline upon the platforms 19 and the operator of the tractor T drives the tractor T along the row in which the plants are to be placed. The forward movement of the tractor causes the lugs 18–a to rotate the wheel 18 causing the pin 18–b to engage the bend 16–a and raise the lever 16 which rocks the shaft 14–e and levers 14–d, drawing the pitmans 14–c, the cross-head 14–a and the valve rod 14 forwardly, thereby opening the valve in the pipe 13–a to allow water from the tank 13–c to flow from nozzle 13 into the furrow made by the trenching and spreading blade 11. When the pin 18–b passes off of the bend 16–a, the released lever 16 by reason of its resiliency snaps down and strikes the plate 16–b, causing a sharp sound thereby signalling to one of the workmen to place a plant at the point in the furrow at which the charge of water has been supplied by the nozzle 13. The lowering of lever 16, aided by the spring on the valve stem causes the valve to close and cut off the water from the nozzle 13.

As the tractor moves forward, the shoes 12 shoulder the earth about the placed plant.

On the following cycle, the other workman places a plant.

The plow 20 serves to level the hill previously made by the process of fertilizing the row.

It is obvious that since the lugs 18–a engaging the ground cause the wheel 18 to rotate thereby actuating the means for supplying water to the furrow and giving the signal for placing each plant in the furrow, the spacing of the plants is determined by the diameter of the wheel 18. Since the wheel 18 is easily demountable from the frame 7, the user of the machine may be supplied with several wheels of different diameters. Also it is to be understood that the wheel 18 can be provided with a demountable rim carrying the lugs 18–a. Use of rings of different diameters provides means for varying the distance between the plants.

While I have shown in the drawings only one pin 18–b for operating the lever 16, the wheel 18 can be provided with a plurality of such pins, and they can be so disposed as to actuate the lever 16 successively as wheel 18 is rotated, thereby effecting operation of the machine at precisely determined intervals.

Having described my invention, what I claim is:

1. In a transplanting machine to be mounted on a vehicle, the combination of a bracket removably mounted on the forward end of the vehicle; a transverse rod adjustably mounted on said bracket; a frame pivotally mounted on said rod; means mounted on the vehicle for rocking said frame about said rod; means on the frame to trench and spread earth to form a furrow to receive plants; and means on said frame to supply measured quantities of water at determined points in said furrow comprising a water conduit having a discharge end and another end to be connected to a source of supply, said conduit being secured to said frame adjacent said discharge end and having a valve therein at said discharge end, a ground-engaging wheel having at least one actuating pin, said wheel being rendered operative and inoperative by rocking of said frame, a bell-crank pivoted on said transverse rod, a biased lever secured to said bell-crank and engaged periodically intermediate its length by said actuating pin to be rocked by said pin, a rod attached to said valve, a cross-head secured to said rod, and a pair of pitmans each attached at one end to said cross-head and at its other end to said bell-crank whereby said valve is opened and water is supplied at determined points when the bell-crank is rocked.

2. A machine, according to claim 1, in which said ground-engaging wheel is adjustably, removably journaled on said frame, said lever has a bend normally disposed in the path of travel of the pin on said wheel, and said lever is adapted to strike the frame after being rocked by the pin on the wheel.

References Cited in the file of this patent
UNITED STATES PATENTS

| | | |
|---|---|---|
| 520,477 | Bemis et al. | May 29, 1894 |
| 653,425 | Moehring | July 10, 1900 |
| 1,838,535 | Dattisman | Dec. 29, 1931 |
| 2,230,643 | Hershey | Feb. 4, 1941 |
| 2,378,143 | Jensen | June 12, 1945 |
| 2,475,078 | Cherry | July 5, 1949 |
| 2,506,430 | Melvin | May 2, 1950 |
| 2,620,757 | Ahlen | Dec. 9, 1952 |
| 2,658,768 | Melvin | Nov. 10, 1953 |
| 2,719,498 | Goolsby | Oct. 4, 1955 |

OTHER REFERENCES

Publication: Brochure (4 pages, received in U. S. Patent Office March 13, 1950, pages 2 and 3 required) of Green Transplanter, advertised at page 57 of Farm Implement News, February 25, 1950, vol. 71, No. 4.